Sept. 27, 1955  H. E. TEMPLE  2,718,972
RACK LOADING AND UNLOADING APPARATUS
Filed Feb. 20, 1950  8 Sheets-Sheet 2
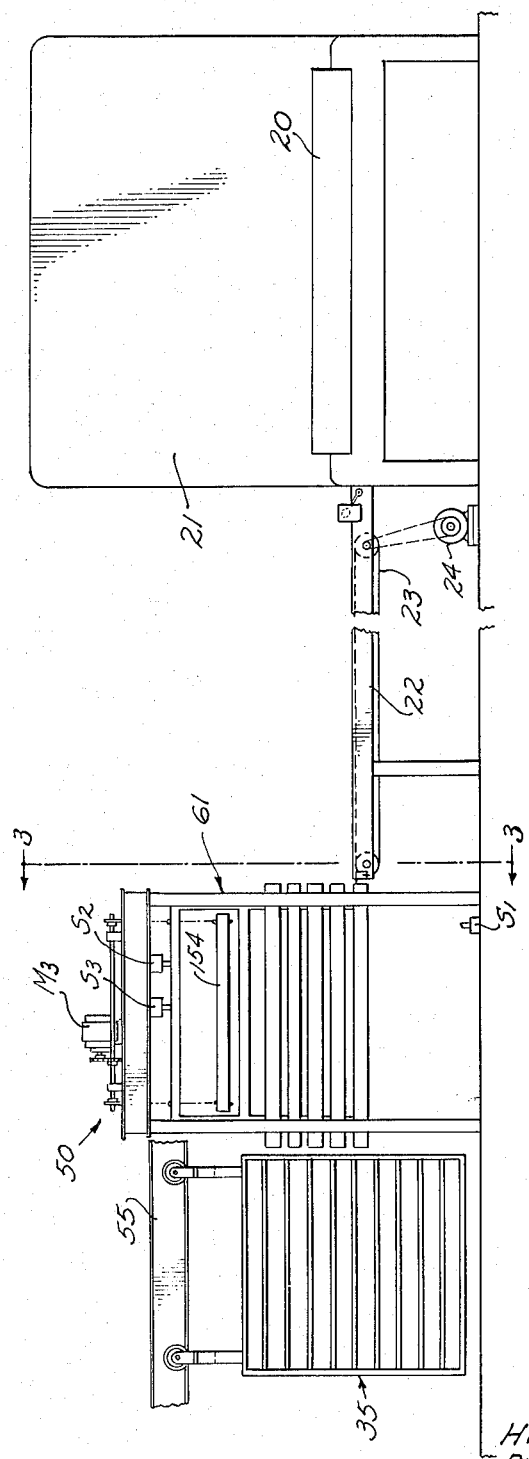
INVENTOR
HIRAM E. TEMPLE
BY HIS ATTORNEYS
HARRIS, KIECH, FOSTER & HARRIS

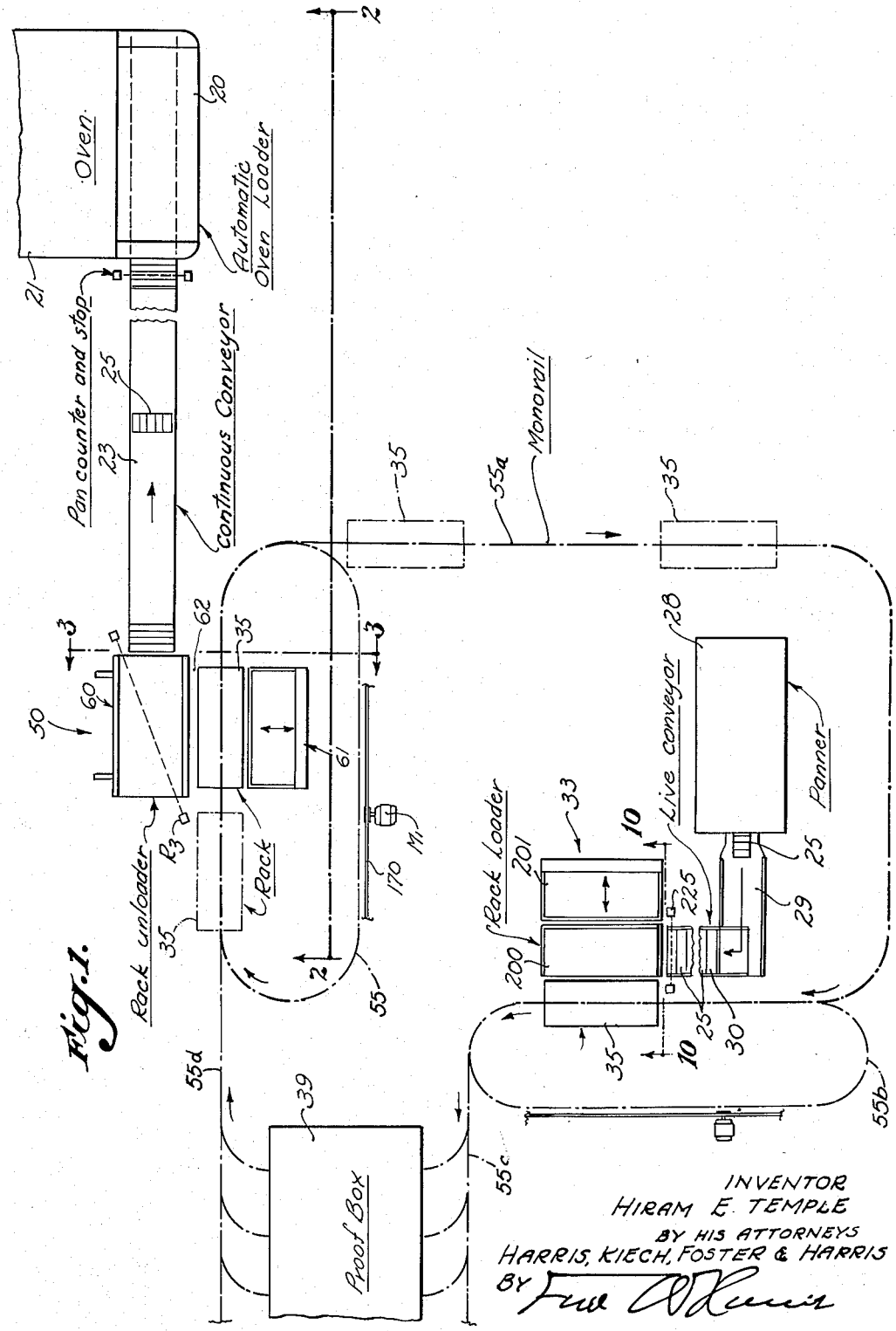

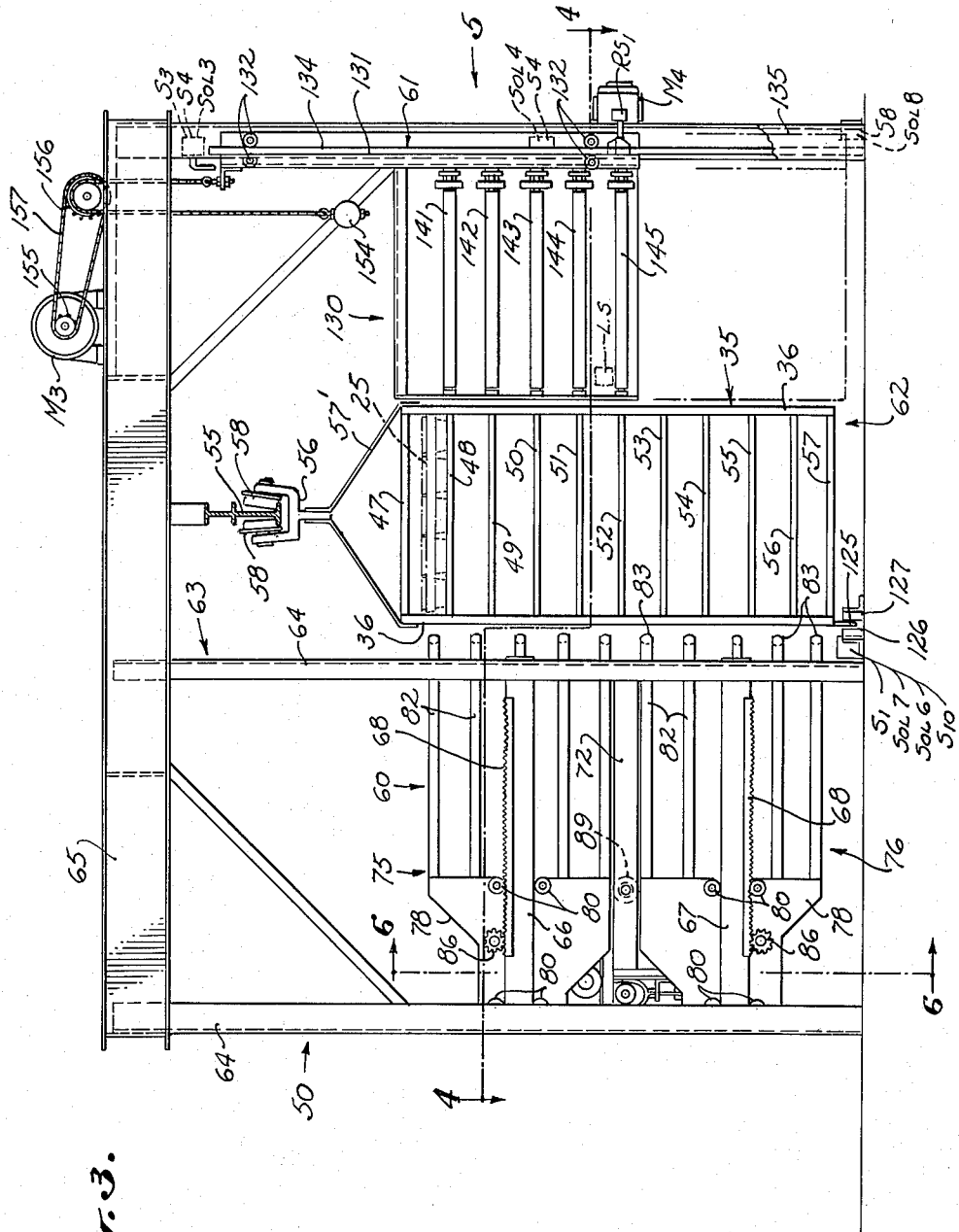

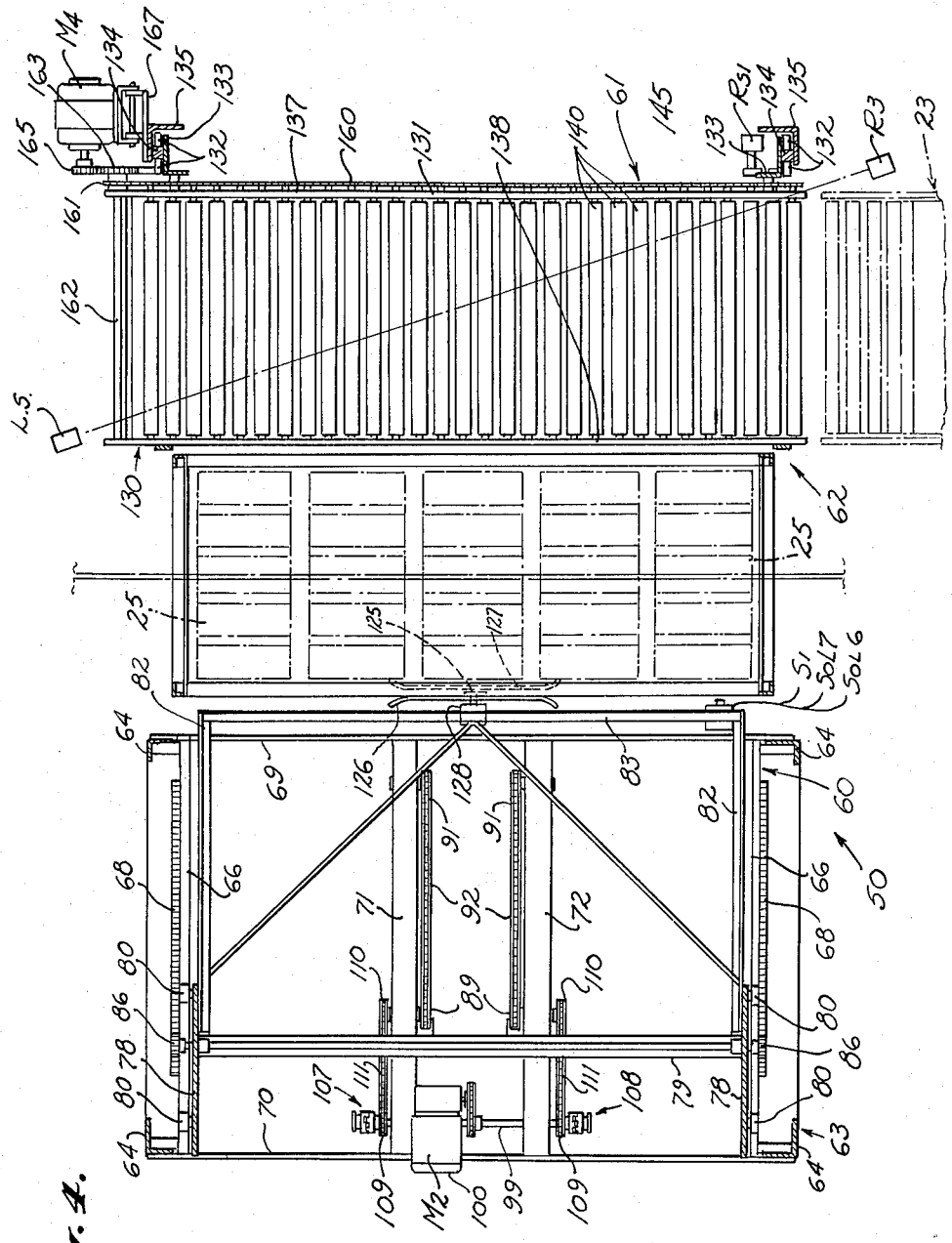

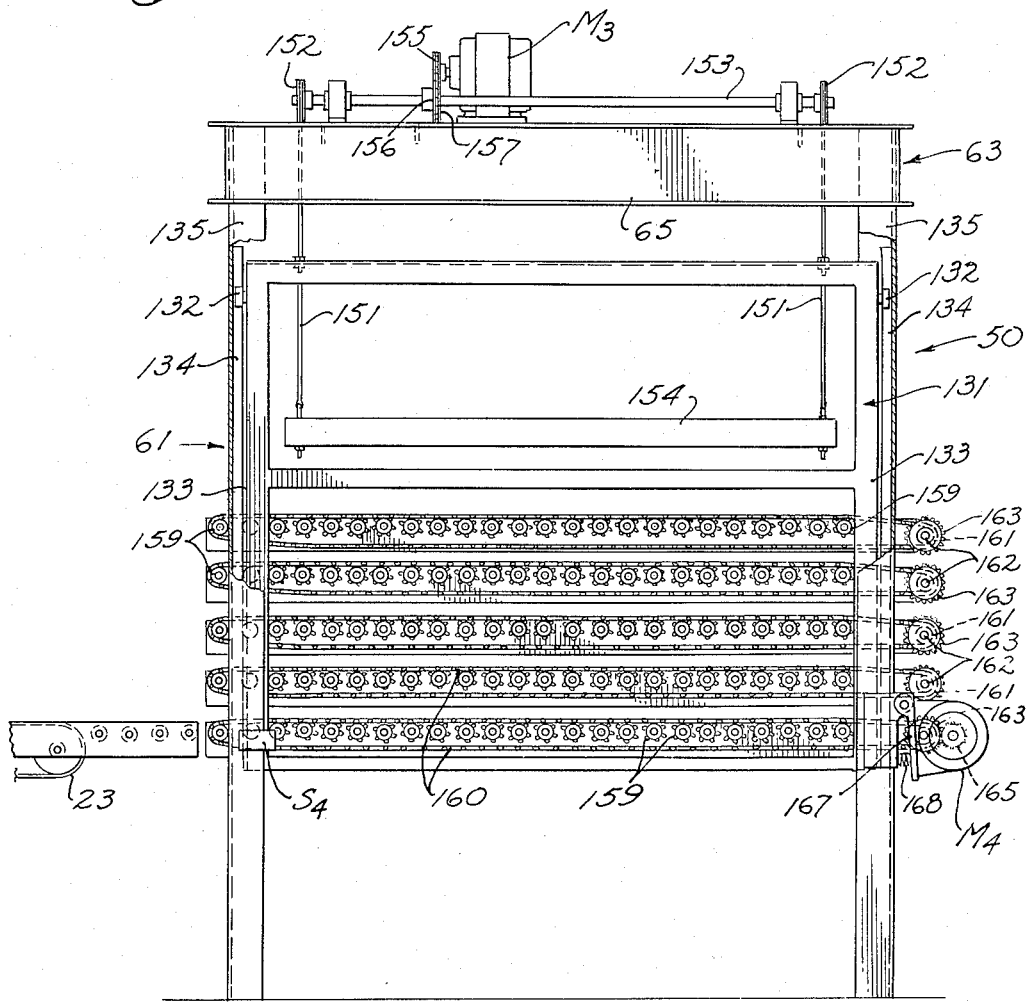

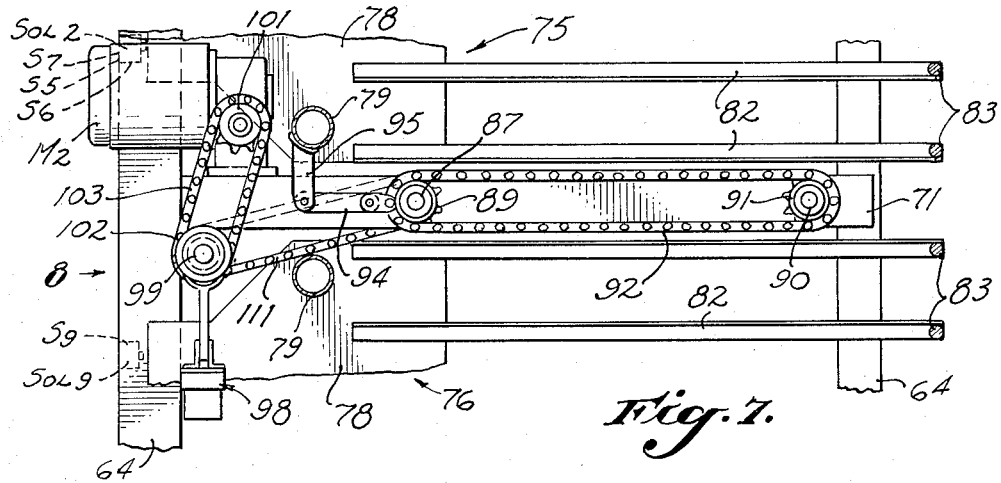
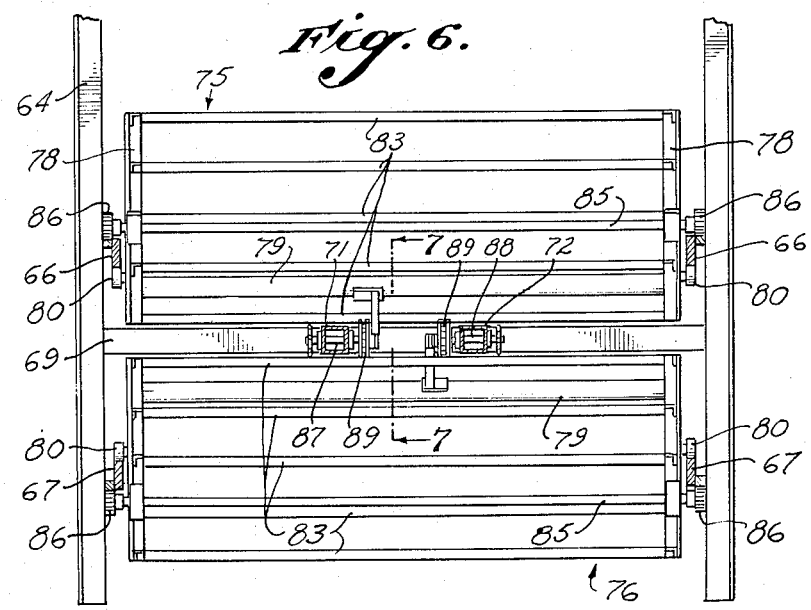
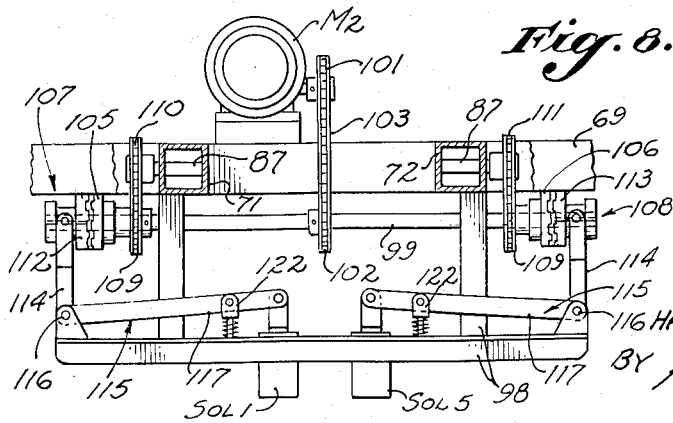

| United States Patent Office | 2,718,972
Patented Sept. 27, 1955 |
|---|---|

2,718,972

RACK LOADING AND UNLOADING APPARATUS

Hiram E. Temple, Los Angeles, Calif., assignor, by mesne assignments, to Read Standard Corporation, a corporation of Delaware Application February 20, 1950, Serial No. 145,274

15 Claims. (Cl. 214—38)

My invention relates generally to article handling and conveying apparatus and particularly to means for transferring articles from one support onto another, such as from a relatively stationary carrier onto a traveling conveyor to be conveyed thereby or conversely, from a conveyor onto a holder or carrier. The invention has particular utility when embodied in a bakery system wherein bread dough in pans is fed to an automatic oven loader located at one end of an oven of the traveling type, the oven loader being operative to place the pans of dough successively onto a conveyor which transports the pans at a slow rate of speed through the oven to bake the bread, the article transferring apparatus being herein disclosed in this connection, by way of example.

As mentioned above, the embodiments of my invention are intended primarily for use in a bakery system employing an oven of the so-called traveling type although, as will be hereinafter apparent, they may be employed successfully in connection with ovens of other types. In an oven of the traveling type, pans containing dough to be baked are placed on a continuously moving conveyor which extends through the oven, from the inlet to the outlet end thereof, the length of the oven being sufficient to insure thorough baking of the loaves of bread by the time the pans containing the loaves arrive at the outlet end of the oven. For convenience in handling the pans, it is common practice to arrange them in groups of, for example, four, five or six, and the pans of each group are interconnected by a strap member which encircles the group and which is usually fluted or ribbed. Such groups of connected pans are commonly referred to as pan straps.

Ovens of the traveling type are designed for quantity production and baking rates of 8,000 loaves of bread per hour are not uncommon. The loading and unloading of such an oven present a serious problem to the baking industry. That is to say, the problem of handling the pan straps prior to and subsequent to the baking operation has long been a serious one. In an effort to load the pan straps into the oven in a systematic manner, automatic oven loading apparatus has been proposed. In addition, an oven unloading apparatus capable of receiving the pan straps as they are discharged by the conveyor of the oven, inverting the pans and loosening the loaves of bread from their pans to cause them to be dumped, and for delivering the empty pans to a point remote from the oven for refilling has been successfully applied to use in bakery system.

In accordance with the usual practice, the pan straps are delivered from a "proofing box" to the inlet end of the oven on racks which consist of mobile carriers having a plurality of shelves upon which the straps are supported. The individual pan straps are removed manually from the rack shelves and placed in the oven loader or onto a suitable conveyor which feeds them to the oven loader mechanism. As will be apparent, the task of manually transferring the pan straps by this procedure is indeed a laborious and tedious one, requiring continuous and concentrated effort on the part of the workmen in order to maintain an uninterrupted feeding of the pan straps to the oven loader. If the continuous feeding of the pan straps into the oven is interrupted for any reason, the production of the oven is seriously curtailed. At another station in the bakery system, straps of pans are loaded with dough in a so-called "panner" and it is necessary to load the filled straps of pans onto the shelves of the mobile racks which then function to transport the pan straps through the proofing box and to the oven loading mechanism.

My invention is concerned primarily with an automatic transferring apparatus which, in one embodiment, is capable of both loading pan straps onto the shelves of a mobile rack and in another embodiment is adapted to unload them therefrom, and it is therefore an important object to provide a transferring apparatus which functions automatically to perform such transferring of the pan straps in a systematic and efficient manner so that manual operations are eliminated and a more positive, continuous feeding of the pan straps through the cycle of operations is effected.

Another object is to provide a transferring apparatus which can be utilized to great advantage in automatically removing the pan straps successively from a rack, which has been previously moved to a location adjacent a feeding belt or conveyor for feeding the straps to the oven-loading mechanism, and transferring the straps onto said feeding conveyor. In accordance with my invention, this object is best attained by providing pushing means for sliding the pan straps from at least one shelf on the rack and preferably simultaneously from a plurality of the shelves, onto shelf-like supports of an elevator which is movable vertically to align the individual supports with the feeding conveyor, the apparatus also embodying conveying means for transferring the pan straps from the supports successively aligned with the feeding conveyor, onto the latter.

Another object of the invention is to provide slidable pusher or ejector means which includes a plurality of pusher elements adapted to move in unison and each functioning to eject a pan strap from one of the rack shelves and deposit it on a support of the elevator. A related object is to provide, in an apparatus of the character referred to, a pair of alternately operative pusher means, one arranged above the other, the upper pusher means being adapted to transfer the pan straps from the upper group of shelves of the rack and the lower pusher means functioning to strip the pan straps from the lower group of shelves of the rack. By this provision, only two pusher means are necessary to transfer all of the pan straps from all the shelves of the rack onto the elevator so that the construction is greatly simplified.

A further object is to provide an apparatus of the type indicated in which the elevator is of a height and has a sufficient number of supports to adapt the elevator to receive and support the pan straps delivered thereto from one-half the total number of shelves of the rack, the elevator being moved intermittently and alternately to an upper and a lower position so as to adapt it to receive the pan straps ejected alternately from the upper and lower groups of shelves of the rack. Another object in this respect is to provide power operated means for alternately raising and lowering the elevator, separate power operated means for actuating the individual pusher means, and control means, responsive to the position of the elevator, for energizing either of the pusher operating means so that the appropriate pusher means, that is, the pusher means which is in register with the elevator when the latter is in either its upper or lower position, is automatically brought into operation. By this means, when the elevator has been moved, for example, to its upper position, the control means functions to activate the upper set of pusher elements so as to transfer the pan straps from the upper group of shelves of the rack onto the elevator, and upon full return of the elevator to its lower position the control means acts to render the lower group of pusher elements operative to effect transfer of the pan straps from the lower group of shelves of the rack onto the elevator. While the apparatus may have a single pushing means for simultaneously transferring the pan straps from the several shelves of the rack onto the elevator, it is preferable to employ two or more such pushing means so that it is unnecessary to move the elevator downwardly to a point beneath the floor upon which the apparatus rests in order to transfer pan straps onto the upper shelves of the elevator.

Another object is to provide control means for controlling the operation of the elevator actuating means to effect intermittent raising and lowering of the elevator to successively align its pan strap supports with the feeding conveyor, this control means being in the nature of a detector adapted to detect the presence or absence of pan straps on each support aligned with the feeding conveyor and operative, following the transfer of the pan straps from each support, to energize the elevator operating motor to shift the elevator through a distance equal to the spacing of the supports. A further object in this respect is to provide a reversible elevator operating motor and control means, responsive to the transferring of the pan straps from the uppermost and lowermost supports of the elevator, for reversing the motor.

A further object is to provide means on the elevator for moving the pan straps therefrom onto the feeding conveyor for delivery to the oven loading mechanism, said moving means comprising a plurality of sets of rollers, each set constituting one of the aforementioned strap supports. In accordance with the present concept, the rollers of each set of rollers are operatively connected by means of an endless chain which functions to rotate them in unison, the several rollers together providing a conveying device for transferring the pan straps from the elevator to the feeding conveyor. A related object is to provide means for driving the chains of the individual conveying devices, this means preferably comprising a gear associated with each conveying device, and a single driving motor arranged in the path of vertical movement of the gears and having a driving gear adapted to mesh successively with the individual gears of the conveying devices so as to drive each device brought into alignment with the feeding conveyor. A further related object is to provide control means adapted to detect the presence or absence of pan straps on the feeding conveyor and operative to energize the motor for the conveying devices after a pan strap, previously transferred onto the feeding conveyor, has been moved thereby to a predetermined position, so as to maintain a substantially uniform, intermittent feeding of the pan straps to the oven loader in spaced relation.

A further object is to provide a control means which operates in response to the moving of a rack completely into unloading position to permit closing of the electric circuits for the several operating motors in sequence so as to effect unloading of the pan straps from the rack, said control means thus preventing unwarranted operation of the unloader when no rack is in place, or when a rack is improperly positioned.

A further object of the invention is to provide in a bakery system an improved means for handling pans of dough prior to the placing thereof in the oven, this means comprising an overhead monorail track along which the racks travel, said track having a closed path which extends through the present pan strap transferring apparatus. By this means, a steady feeding of the pans of dough to the oven without manual effort is attained.

A further object is to provide in a bakery system a loading apparatus which is operable to load straps of pans, which are discharged successively from the panner apparatus, onto the shelves of the racks to be subsequently transported thereby through the proofing box. In accordance with the invention this loading apparatus includes substantially the same components as the pan transferring apparatus but operates in a somewhat different sequence of steps, the loading apparatus being operative to transfer pan straps from a traveling conveyor, extending from the panner, onto the supports of an elevator which is movable vertically and intermittently, the apparatus further including transferring members which function to transfer the straps from the elevator onto the shelves of the rack.

Further objects will appear from the following specification and from the drawings, which are intended for the purpose of illustration only, and in which:

Fig. 1 is a small scale plan view of the pan strap handling system of this invention, showing it in connection with an automatic bakery oven;

Fig. 2 is a vertical sectional view, taken on line 2—2 of Fig. 1 and illustrating the rack unloading apparatus for transferring pan straps from racks onto a conveyor for feeding the pan straps to an oven loading mechanism;

Fig. 3 is an end elevational view of the rack unloader, as observed in the direction of the arrow 3 in Fig. 2;

Fig. 4 is a sectional plan view of the rack unloader, taken on line 4—4 of Fig. 3;

Fig. 5 is a side elevational view, as observed in the direction of the arrow 5 in Fig. 3;

Fig. 6 is a cross-sectional view, taken on line 6—6 of Fig. 3;

Fig. 7 is an enlarged sectional view, taken on line 7—7 of Fig. 6;

Fig. 8 is an elevational view, as observed in the direction of the arrow 8 in Fig. 7;

Figure 9:
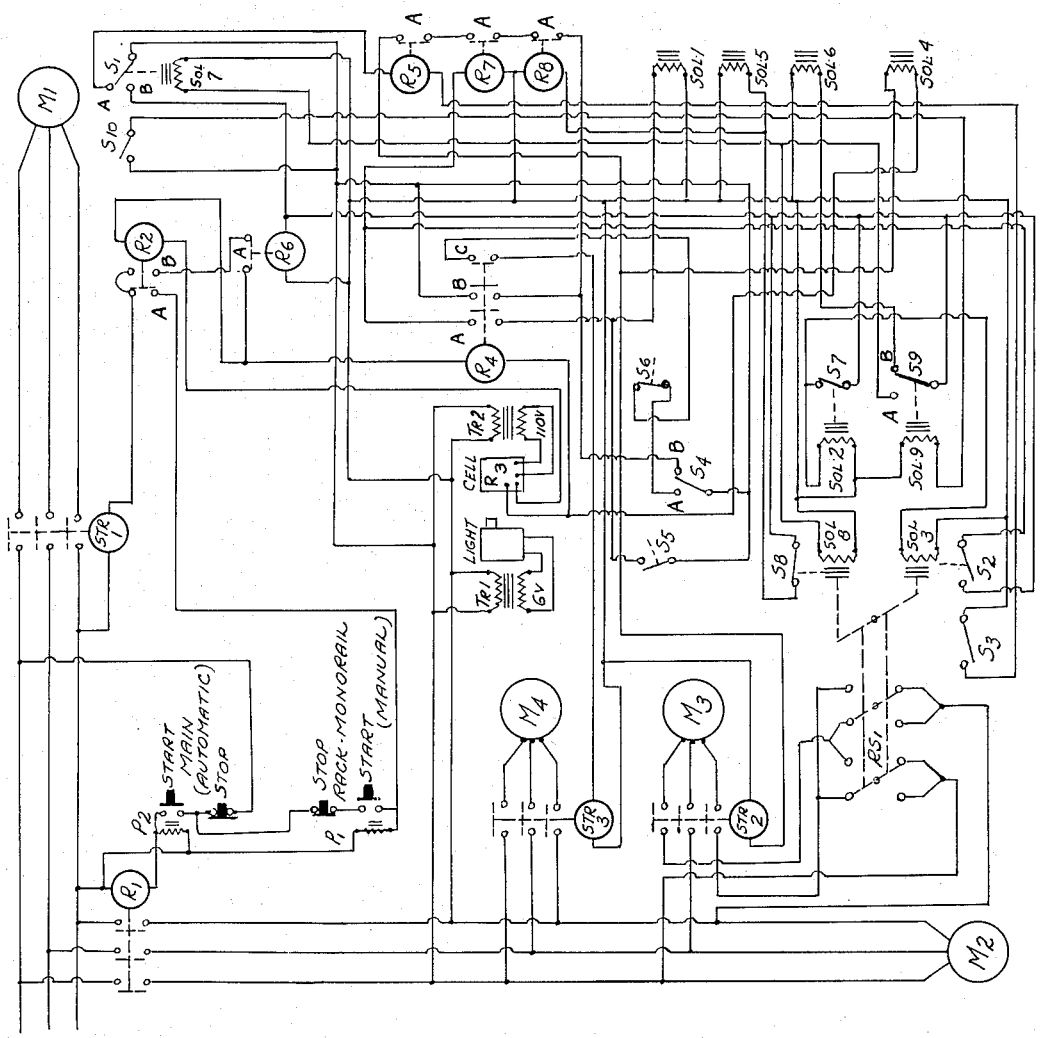
Fig. 9 is a diagram of the electrical control circuit.

Referring first to Fig. 1 of the drawings, the present article handling and conveying system is herein shown, by way of example, in a form suitable for installation in a bakery for continuously feeding pans of dough to an automatic oven loader 20 which functions to feed the loaded pans into an oven 21. The oven 21 may be of the traveling type designed for quantity production and baking rates of approximately 8,000 or more loaves of bread per hour, but since the oven forms no part of the present invention it is not shown in detail. The oven loader 20 may be of any type capable of feeding straps of loaded pans to the continuously traveling conveyor of the oven. After traveling through the oven 21, the pan straps are inverted and the baked loaves of bread are loosened to cause them to be discharged from their pans, this operation being performed by an oven unloader which is not shown in the drawings since it forms no part of the present invention. The empty pan straps are then delivered to a point remote from the oven for cooling and refilling, the delivery means not being herein illustrated.

The present invention is concerned primarily with a pan strap handling system by which the loaded straps of pans are fed automatically and continuously to the oven loader 20. Extending alongside the oven loader 20 is a long frame 22 which supports a conveyor belt 23. The belt 23, which is herein referred to as a feeding conveyor or feeding means, is continuously driven by any suitable driving means, such as an electric motor 24, and is adapted to feed straps 25 of loaded pans into the receiving end of the oven loader 20.

The pans 25 are loaded with dough in a so-called "panner" which is indicated generally by the reference numeral 28 in Fig. 1, this mechanism being common in the bakery art. In the present system, the loaded straps 25 of pans are discharged from the panner 28 onto an idler or "dead" conveyor 29 and are delivered onto one end of a "live" conveyor belt 30. Upon reaching the conveyor 30, the pan straps 25 are fed thereby in a path extending at right-angles to the conveyor 29. The conveyor 30 functions to deliver the pan straps 25 to a carrier or rack loading apparatus, indicated generally at 33 in Fig. 1. The rack loader 33, which will be described in detail hereinafter, operates to transfer the pan straps 25 onto a carrier or rack 35.

In the present system, a plurality of the racks 35 may be employed, each rack consisting of four corner posts 36 between and to which vertically spaced shelves are secured, the shelves being designated by the reference numerals 48 to 57 in Fig. 3. After being loaded with pan straps 25, each rack 35 is moved into and through a "proof box" 39 where the dough is raised or leavened to the extent necessary to induce baking of the dough in its raised state at a later stage in the cycle. After remaining in the proof box 39 for a predetermined period, each rack 35 is moved into a carrier or rack unloading apparatus 40. The rack unloader 40, which is described in detail hereinafter, functions to transfer the pan straps 25 from each rack 35 onto the feeding conveyor 23 which, as explained before, delivers the pan straps to the oven loader 20.

After being unloaded, each rack 35 is returned to the loading apparatus 33 to receive a new load of filled pan straps 25. It is thus seen that the racks 35 are moved along a path which extends through the loader 33, the proof box 39 and the unloader 40. In order to facilitate the movement of the racks 35 through this path, I prefer to mount the racks for travel along several overhead monorail or tramrail systems 55, 55a, 55b, 55c and 55d. As indicated in Fig. 1, the monorail 55 extends through the rack unloader 40 and is adapted to receive racks from the monorail 55d leading from the proof box 39 and to guide them through the unloader. The unloaded racks are delivered to the monorail 55a along which they can be fed to the panner 28 for reloading. The monorail system 55b is employed for transporting the loaded racks 35 to the monorail 55c which guides them into the proof box 39.

As shown in Fig. 3, the tramrail 55 may consist of an I-beam suitably suspended from the ceiling of the bakery room and provided with lower horizontal flanges. Each rack 35 is suspended from a carriage 56 by strips 57', the carriage having wheels 58 which are adapted to roll along the flange of the tramrail 55. It is thus seen that the racks 35 are guided by the tramrail 55 through the path referred to above, the lower shelves 57 of the racks being disposed slightly above the floor. The racks 35 are adapted to be propelled manually along the tramrail 55, although it is within the concept of this invention to provide power-operated propelling means, to be later described, for this purpose.

The rack loading apparatus and the rack unloading apparatus are similar in construction but their components are arranged in somewhat different order. Since the components are similar, only one apparatus, namely the rack unloading apparatus, is shown in considerable detail in the drawings. Referring to Figs. 1, 3 and 4, it will be seen that the rack unloader 40 comprises two main components, namely a pusher means 60 and an elevator means 61. The pusher and elevator means are spaced apart to provide a passageway 62 into and through which each rack 35 can move along the tramrail 55.

The pusher means 60 includes a rectangular frame 63 having angle-iron corner posts 64, the upper ends of which are connected by channel-iron beams 65. The pairs of posts 64 at each end of the frame are connected by vertically spaced, horizontal bars 66 and 67. Each bar 66 and 67 is provided with a longitudinally extending gear rack 68. Extending between crossstrips 69 and 70 at the front and rearward sides of the frame 63 are hollow support bars 71 and 72.

A pair of pusher elements or rams 75 and 76 is supported by and slidable along the bars 66 and 67 toward and away from the elevator means 61. Each element 75 and 76 comprises a pair of plates 78 which are joined by a transverse, horizontal tube 79. Each element 75 and 76 has pairs of rollers 80 which roll against the upper and lower edges of the bars 66 and 67, respectively, the elements thus being slidably supported. Each pusher element 75 and 76 has a plurality of forwardly projecting arms 82, between the forward free ends of which extend circular, transverse pusher bars 83. As shown in Fig. 3, each ram 75 and 76 has five pusher bars 83, the total number of bars, that is ten, corresponding to the number of shelves 48 to 57 of the rack 35 upon which the pan straps 25 may be supported as the rack enters the rack unloading apparatus 40. As will be hereinafter shown, the pusher elements 75 and 76 are adapted to be moved individually and alternately toward the rack 35 to cause the pusher bars 83 to engage and push the pan straps 25 from either the upper or lower set of shelves of the rack so as to place the pan straps on the elevator 61. That is to say, the pusher element 75 is adapted to transfer pan straps 25 from the upper five shelves 48, 49, 50, 51 and 52 of a rack 35 onto the elevator 61 which is so constructed as to be capable of supporting five layers of the pan straps. Likewise, the pusher element 76 functions to transfer the pan straps 25 from the lower five shelves 53, 54, 55, 56 and 57 onto the elevator 61, which is adapted to be lowered to a position to receive the pan straps discharged from these shelves.

The pusher elements 75 and 76 are supported entirely by the bars 66 and 67 for movement toward and away from the rack 35. In order to maintain the pusher bars 83 of the elements 75 and 76 in alignment with the rack 35 and to prevent turning of the elements on a vertical axis, each element carries a transverse shaft 85 having small gears 86 secured to its ends, these gears meshing with the fixed gear racks 68.

As shown in Figs. 6 and 7, the support bars 71 and 72 rotatably support short transverse shafts 87 and 88 respectively at their rearward ends, these shafts carrying sprockets 89. The support bars 71 and 72 also carry stub shafts 90 adjacent their forward ends on which are rotatably mounted similar sprockets 91. Chains 92 extend around the pairs of sprockets 89 and 91 of each support bar 71 and 72. The chains 92 are connected by pivoted links 94 to arms 95 affixed to the transverse tubes 79. It is thus apparent that when the chains 92 are rotated they act through the links 94 and arms 95 to first draw the pusher elements 75 and 76 forwardly to cause the pusher bars 83 to transfer the pan straps 25 from the rack 35 onto the elevator 61 and to thereafter return the pusher elements to first or inoperative position. As will be next shown, the chains 92 of the upper and lower pusher elements 75 and 76 are driven alternately from a common source of power.

Secured to the support bars 71 and 72 is a support bracket 98 in which a transverse countershaft 99 is rotatable, the countershaft being adapted to be rotated by an electric motor M2 through the medium of sprockets 101 and 102 and a chain 103 (Figs. 7 and 8). Rotatably mounted on the countershaft are the driven elements 105 and 106 of respective clutches 107 and 108. The clutch elements 105 and 106 have integral sprockets 109 which are adapted to drive sprockets 110 fast on the shafts 87, by means of chains 111.

Keyed to the ends of the countershaft 99 so as to be slidable axially thereof are the driving elements 112 and 113 of the clutches 107 and 108. The elements 112 and 113 have peripheral grooves in which rollers at the upper ends of arms 114 of bell-crank levers 115 engage. The bell-crank levers 115 are pivoted at 116 and have substantially horizontal arms 117 which are pivotally connected to the armatures of solenoids SOL1 and SOL5 (Fig. 8) which are carried by the bracket 98. Spring actuated plungers 122 function to normally maintain the clutch elements 112 and 113 disconnected from their respective mating clutch elements 105 and 106.

As will be hereinafter explained in detail, energization of the solenoids $SOL_1$ and $SOL_5$ is controlled by means which is responsive to the vertical position of the elevator 61. When the elevator 61 reaches the extent of its upward movement, the solenoid $SOL_1$ is energized to effect engagement of the clutch elements 105 and 112 so as to cause rotation of the left-hand shaft 87 (Figs. 6 and 8) so as to rotate the chain 92 which reciprocates the upper pusher means 75 through a pushing and a return stroke. Likewise, when the elevator 61 reaches its lowermost position, the solenoid $SOL_5$ is energized to engage the clutch elements 106 and 113 of the clutch 108 so as to drive the chain 92 which reciprocates the lower pusher means 76.

As shown in Figs. 3 and 4, each rack 35 is provided with a downwardly projecting runner 125 which is adapted to enter the space between a pair of guides 126 and 127 fastened to the floor within the space or aisle 62. By this means, when a rack 35 is disposed in the unloading apparatus 40, it is held against pivoting on the tramrail 55 during the pushing of the pan straps 25 from its shelves onto the elevator. An electric switch $P_2$ (Fig. 9) is disposed adjacent the guides 126 and 127 with its actuating button in position to be engaged by the runner 125, so as to close the switch. The switch $P_2$ is connected in an electrical circuit as shown in Fig. 9 and when it is closed, the automatic operation of the rack unloading mechanism is initiated.

The elevator means 61 is constructed as next described. The elevator includes an open rectangular member 130 constructed from structural iron sections and having a rectangular front frame 131 having pairs of rollers 132 at its sides 133 adapted to roll against the sides of vertical guide bars 134 to be guided thereby during the vertical movement of the elevator, the bars 134 being carried by angle-irons 135 of the main frame 63 of the apparatus (Figs. 4 and 5). Journaled in horizontal strips 137 and 138 at the front and rear of the elevator frame member 130 are the reduced ends of a plurality of rollers 140 which are arranged in tiers, each horizontal row or tier of rollers providing, in effect, a shelf or support adapted to receive and support the straps 25 of pans discharged from a rack 35 by the pusher means 75 and 76. The number of vertically spaced roller supports or shelves is equal to one-half the number of shelves of the rack 35, so that the elevator has five roller supports which are designated by the reference numerals 141 and 145.

As will be explained more fully hereinafter, the elevator frame 130 is adapted to be slid upwardly and downwardly to alternately align its several supports 141 to 145 with the upper set of shelves 48, 49, 50, 51 and 52 of the rack 35 and with the lower set of shelves 53 to 57 thereof, and to be raised and lowered intermittently with a step-by-step motion to successively align each of its roller supports 141 to 145 with the feeding conveyor 23 to permit discharge of each tier of pan straps 25 from the individual supports onto the conveyor 23 for delivery to the oven loader 20. The elevator frame 130 is raised and lowered by power operated means, such as the reversible electric motor $M_3$ shown in Figs. 3 and 5. As shown best in these views, a pair of chains 151, each having an end attached to the top of the frame 130, extends over a sprocket 152 carried by a transverse shaft 153 rotatable at the top of the main frame 63. The other ends of the chains 151 hang from the sprockets 152 and carry between them a counterweight 154. By this counterweight means, very little power is required to slide the elevator. The motor $M_3$ drives the shaft 153 through the medium of sprockets 155 and 156 and a chain 157. Actuation of the motor $M_3$ is controlled by means to be later described.

The several rollers 140 of each of the supports 141 to 145 are adapted to be rotated simultaneously, when each support is aligned with the feeding conveyor 23 so as to provide, in effect, a conveyor means for transporting the pan straps from the elevator onto the feeding conveyor. As shown in Fig. 5, each roller 140 carries a small sprocket 159 and engageable with the teeth of these sprockets is the upper bight of an endless chain 160. Each chain 160 extends around a sprocket 161 carried by a shaft 162 at one side of the elevator frame 130 (Figs. 4 and 5). Each shaft 162 also carries a spur gear 163.

Each gear 163 is adapted to be brought into meshing engagement with a pinion gear 165 fast on the armature shaft of a continuously operated electric motor $M_4$. The housing of the motor $M_4$ is pivotally connected to a bracket 167 mounted on one of the uprights 135 of the frame 63 (Figs. 4 and 5). A spring 168 provides resiliency for the motor housing so that the motor can yield slightly in a substantially horizontal direction to prevent damage to the teeth of the gears 165 and 163 as the latter are moved into meshing engagement.

It will be apparent from the above that as each gear 163 is brought into mesh with the driving gear 165, the several sprockets 159 and rollers 140 of the row driven by the particular gear 163 are rotated by the chain 160 so that the pan straps 25 resting upon the particular support 141 to 145 which is aligned with the conveyor 23 are transferred onto the latter.

As indicated before, the elevator 130 is moved alternately upwardly and downwardly with a step-by-step motion to predetermined indexed positions so as to align successively the roller supports 141 to 145 with the conveyor 23. As the elevator 130 pauses following each vertical indexing thereof, the live rolls of the support aligned with the conveyor are rotated to discharge the pan straps from the support onto the conveyor 23. When bread racks 35 having an even number of shelves are used, pans are not discharged from the elevator when the elevator 130 is in its lowermost position, that is, in a position to receive pans transferred by the lower pusher means 76. In such case it is necessary that the elevator move upwardly to a position where its uppermost support 141 is aligned with the conveyor 23. When racks 35 having an uneven number of shelves are used, that is, one shelf less than twice the number of shelves or supports of the elevator the top support 141 of the elevator is in alignment with the conveyor 23 when the elevator is in its lowermost position and discharging of the pans from this support takes place at the same time that the lower pusher means 76 pushes the lower set of pans onto the supports of the elevator.

Before describing the sequence of operations of the rack unloading mechanism, it is to be noted by reference to Fig. 1 that the system preferably includes automatic means for propelling the racks 35 along the tramrail 55, this means including an endless cable 170 having pusher elements, in the form pivoted latches which engage the racks, and a motor $M_1$ for driving the cable. It will be apparent that other rack-moving means may be substituted for the tramrail system 55 within the purview of this invention. If preferred, the racks may be wheeled manually along the floor into and from the rack unloading apparatus. It is to be noted that a photo-electric device $R_3$ is so disposed relative to the elevator 130 that the photo-electric beam thereof is directed diagonally across the elevator in a plane which is aligned with the plane of discharge of the pans 26 from the elevator onto the conveyor 23. This photo-electric device functions to set the motor $M_3$ in motion after the elevator 130 has been loaded with pan straps 25 and to control the operation of motor $M_4$ so that the live rolls 140 are rotated following each vertical indexing of the elevator. A reversing switch $RS_1$ is operated by lugs on the elevator 130 (Fig. 3) and functions to reverse the electric motor $M_3$ following each full upward and downward movement of the elevator. A double pole limit switch $S_4$ is disposed on the frame 63 and adapted to be engaged and actuated by each roll support 141 to 145 to control the starting and stopping of the motors M₃ and M₄.

In the electrical diagram (Fig. 9) the various motors, motor starters, solenoids, switches, etc., may be identified by consulting the following legend:

| Part | Control and Function | Actuated By— |
|---|---|---|
| P₁ | Start-Stop Mag. Push Button Sta. Monorail. | Manual. |
| STR₁ | Mag. Line Starter, Monorail Motor M₁. | P₁ or P₂. |
| M₁ | Motor and Brake, 3 Phase, Monorail. | STR₁. |
| P₂ | Start-Stop Mag. Pushbutton Sta. Automatic System Control. | Manual. |
| R₁ | Magnetic Contactor—3 Pole, Main Automatic System. | P₂. |
| M₂ | Motor, Pusher Ram Operation. | R₁. |
| TR₁ | Transformer, Light Source. | R₁. |
| TR₂ | Transformer, Photo-electric Relay. | R₁. |
| R₂ | Mag. Relay, Circuit to STR₁. | R₁. |
| S₁ | Limit Switch—Double Throw to R₅ or R₆ and S₂. | Incoming Rack or SOL₇. |
| R₃ | Photo-electric Relay to R₄ and SOL₄. | Light Beam. |
| R₄ | Mag. Relay—3 Pole, Safety Circuit Transfer. | R₃. |
| S₂ | Limit Switch—Mech. Interlock S₁(B) to R₄(A) and R₇. | Elevator—Top Posit. or SOL₃. |
| S₃ | Limit Switch to R₅. | Elevator—Top Posit. |
| R₅ | Mag. Relay to STR₂ and SOL₄. | S₁(A) and S₃. |
| STR₂ | Mag. Line Starter, Elevator Motor. | R₅(A), R₇(A), R₈(A), R₄(B). |
| M₃ | Motor and Brake—3 Phase, Elevator Operation. | STR₂. |
| S₄ | Limit Switch—Double Throw to STR₂ or STR₃. | Elevator, Each Indexing. |
| R₆ | Mag. Relay to STR₁. | S₁(B). |
| R₇ | Mag. Relay to STR₂ and SOL₄. | S₁(B) and S₂. |
| SOL₁ | Solenoid—Engages Top Ram Clutch. | S₁(B), S₂, R₄(A), S₅. |
| S₅ | Limit Switch N. O. Init. Open to SOL₁. | Top pusher Ram, Fwd. Movement. |
| S₆ | Limit Switch—N. O. Init. Closed to STR₁. | Do. |
| S₇ | Limit Switch—Mech. Interlock SOL₂ and SOL₃. | Top Pusher Ram, Back Move. or SOL₂. |
| SOL₂ | Solenoid—Mech. Interlock-Release S₇. | S₇. |
| SOL₃ | Solenoid—Mech. Interlock-Release S₂, Throw RS₁. | S₇. |
| RS₁ | Reversing Switch—Mechanical—Reverses Elevator Motor. | SOL₃ or SOL₈. |
| STR₃ | Mag. Line Starter—Live Roll Motor M₄. | R₄(C), S₆, S₄(A). |
| M₄ | Motor—3 Phase, Live Rolls. | STR₃. |
| SOL₄ | Solenoid—Latch Release on Elevator Stop. | R₃, R₅(A), R₇(A), R₈(A), R₄(B). |
| S₈ | Limit Switch—S₁(B) to SOL₅ and R₈. | Elevator—Low Posit. or SOL₃. |
| R₈ | Mag. Relay to STR₂ and SOL₄. | S₈ and S₁(B). |
| SOL₅ | Solenoid—Engages Lower Ram Clutch. | S₈ and S₁(B). |
| S₉ | Limit Switch—Mech. Interlock D. Throw—SOL₆, SOL₇ and SOL₈. | Lower Pusher Ram Back Move. or SOL₉. |
| SOL₆ | Solenoid—Engages Rack Stop. | S₉(B) and S₁(B). |
| SOL₇ | Solenoid—Mech. Interlock-Release S₁(B). | S₁(B) and S₉(A). |
| SOL₈ | Solenoid—Mech. Interlock-Release S₈ Throw RS₁. | S₁(B) and S₉(A). |
| S₁₀ | Limit Switch to SOL₉. | Outgoing Rack. |
| SOL₉ | Solenoid—Mech. Interlock-Release S₉. | S₁₀. |

SEQUENCE OF OPERATIONS

Special application

Assuming that the bread rack unloader is inoperative, independent operation of the break rack monorail system is as follows:

By operating "Start" push button station P₁, the circuit STR₁ is completed through the normally closed contacts on relay R₂, causing the monorail motor M₁ to run. This can be controlled at will, causing the bread racks to pass through the unloader without stopping for automatic unloading. This service can be discontinued by operating the "Stop" button on either P₁ or P₂.

In the event that the elevator is not in its uppermost position, the system will operate automatically through the balance of its cycle with no sequence stops, and return to the top position and await the incoming bread rack. This feature allows automatic unloading to be started at any time, eliminating the human factor of judging sequence positions. Assuming that at the start of automatic operation a loaded bread rack has not yet entered the unloader via the monorail, and that the elevator is in its uppermost position, automatic operation of the entire system is effected as follows:

By operating the starting button at station P₂, relay R₁ is energized, and this closes the contacts supplying line current to the motor system. Pusher ram motor M₂ thus starts and runs continuously while the automatic system is in operation. Transformers TR₁ and TR₂ are energized to supply light source current and photoelectric cell current, respectively. Relay R₂ is energized to open its contacts A and close its contacts B to STR₁ so as to start the motor M₁ of the monorail. At the start of the automatic cycle limit switch S₁ is in contact with its contact point A, and the elevator is empty and stopped in its upper position. The photo beam is unobstructed and relays R₃ and R₄ are energized. In attaining this position, the elevator has acted mechanically to close limit switches S₂ and S₃ which have caused energization of R₅, thus breaking the circuit to the starter STR₂. This action has caused stopping of the elevator motor M₃, and opened limit switch S₄(B), closing S₄(A).

When the bread rack 35 enters the unloader, it breaks the circuit at limit switch S₁(A), thus de-energizing R₅, and completes the circuit through S₁(B), to energize R₆ to break the circuit to STR₁. This effects stopping of the bread rack motor M₁, energization of the solenoid SOL₆ through S₉(B) to stop the rack 35 in unloading position, and completes the circuit through S₂ to energize R₇ and the top ram solenoid SOL₁. At this time R₇(A) breaks to maintain the circuit to STR₂ open. Top ram SOL₁ engages the clutch 107 to effect movement of the top ram 75. As the top ram moves forward it allows the limit switch S₅ to close, maintaining the circuit to SOL₁ closed and, in addition, allows the limit switch S₆ to open. The top ram pushes a full set of pans from the upper rack shelves 48 to 52 onto the roller supports 141 to 145 of the elevator. As the pan straps 25 are thus pushed onto the elevator, the photo beam is interrupted, causing R₃ and R₄ to be de-energized.

As the top ram 75 returns to its original position, it closes S₆ and S₇, and opens S₅. Limit switch S₅ opens the circuit to SOL₁ to permit disengagement of the top ram power clutch 107, allowing this ram to stop. Limit switch S₇ is held closed by mechanical interlock on the top ram. As S₇ is closed, it energizes SOL₂ which then releases the interlock, allowing S₇ to reopen. At the same instant, the closed limit switch S₇ also energizes SOL₃, which releases the mechanical interlock on S₂, the latter then opening the connection to R₇ and R₄(A). SOL₃ also throws reversing switch RS₁ to await restarting of the motor M₃. Upon the closing of S₆, the circuit to the live roll motor starter STR₃ is closed to start the motor M₄. The live rolls 140 on the elevator cause the pan straps 25 on the roll support in alignment with the conveyor 23 to be discharged onto the latter. When the pan straps 25 clear the elevator, the photo beam becomes unobstructed and R₃ and R₄ are thus energized, circuit to STR₃ is broken through R₄(C) to stop the live roll motor M₄, and the circuit to elevator stop release solenoid SOL₄ and to the elevator motor starter STR₂ is closed, causing the elevator to descend. As the elevator moves downwardly, it opens S₃ (which is inoperative so long as the bread rack 35 is in place) and opens S₄(A). Also, S₄(B) is closed, completing the circuit to STR₂ through S₄(B). This allows the elevator to travel downwardly to the next index position even though the photo beam may be interrupted at intervals by the elevator frame. As the elevator reaches the next index position, a cam lug on the elevator opens S₄(B), and breaks the circuit to the elevator motor starter STR₂ and the elevator stops in this position, if the photo beam is interrupted at this position by pans on the shelf. When the limit switch opens S₄(B), it closes S₄(A), and since the photo beam is interrupted, R₃ and R₄ are allowed to assume a normal position, thus closing R₄(C) to complete the circuit to the live roll motor starter STR₃ which then acts to discharge pan straps 25 from the elevator onto conveyor 23. As the pan straps clear the elevator, the photo beam becomes unobstructed which permits energization of $R_3$ and $R_4$. The circuit to $STR_3$ is disrupted through $R_4(C)$, the circuit to $STR_2$ is completed through $R_4(B)$, and the circuit to $SOL_4$ is completed through $R_4(B)$ and $R_3$. As the elevator moves downward the indexing cam lug on the elevator moves away from $S_4$ allowing $S_4(B)$ to close the circuit to $STR_2$. This procedure is the same on all indexing positions from top to bottom.

If no pan straps are on a shelf for an indexing position, the photo beam is not broken at the time the cam lug on the elevator opens $S_4(B)$ and thus $R_4(B)$ maintains the closed circuit to $STR_2$, and the circuit through $R_3$ and $R_4(B)$ energizes $SOL_4$ to release the elevator stop latch, thus allowing the elevator to pass by an index position without stopping.

As the elevator passes the lowest pan discharge position, it indexes one position lower and comes to rest in a position to receive a charge of pans from the lower part of the bread rack. Upon arriving at this latter position, the elevator closes limit switch $S_8$ completing the circuit to relay $R_8$ and thus the lower pusher ram clutch is operated by the solenoid $SOL_5$. $R_8$ is energized, thus breaking the circuit through $R_8(A)$ to $STR_2$ and stopping the elevator (elevator rests on a positive stop at the lower position). $S_4$ is not actuated at this position where the bread rack has an even number of shelves. However, if the bread rack has an uneven number of shelves, $S_4$ is actuated at the low position (and $S_8$ is not actuated until the pans are discharged onto the conveyor and the elevator is lowered slightly).

When the elevator is stopped in lowermost position, $SOL_5$ is energized to engage the lower pusher ram clutch 108 with the motor $M_2$, thus causing the lower ram to push the lower set of pans from the bread rack shelves 53 to 57 onto the elevator. In this case (even number of shelves) the pans do not cross the path of the photo beam and $R_3$ and $R_4$ remain energized. When the lower pusher ram returns to its original position, it is stopped by the opening of $S_9(B)$ and the closing of limit switch $S_9(A)$, this condition causing opening of the circuit to the bread rack stop latch release solenoid $SOL_6$ and completion of the circuit to the mechanical interlock release solenoid $SOL_7$ on $S_1$ and solenoid $SOL_8$. $SOL_6$ releases the bread rack and $SOL_7$ releases the interlock on $S_1$, thus allowing $S_1(B)$ to open. This effects opening of the circuit to $R_6$ and $S_8$, allowing $R_6(A)$ to complete the circuit to $STR_1$ and bread rack monorail motor $M_1$. Solenoid $SOL_8$ reverses $RS_1$ and releases the mechanical interlock on $S_8$ to allow it to open the circuit to $SOL_5$ and $R_8$ and this disengages the clutch 108 for the lower pusher ram and stops the ram 76 in its original position.

As the monorail transports the empty rack 35 from the unloader apparatus, it momentarily closes limit switch $S_{10}$ to complete the circuit to and energize solenoid $SOL_9$, which then releases the mechanical interlock on $S_9$ to allow the latter to open. $R_8(A)$ then completes the circuit to $STR_2$ of the motor $M_3$, causing operation of the elevator. As the elevator rises, the same automatic indexing sequence as that previously outlined, takes place.

If another loaded bread rack arrives at an operative position within the unloader apparatus before the elevator has reached its uppermost position, the limit switch $S_1(B)$ closes the circuit to $SOL_6$ and to $R_6$, which breaks the circuit to $STR_1$ through $R_6(A)$ and allows the monorail to stop the loaded rack in operative position to await unloading.

As the elevator rises to the top position, it closes $S_4(A)$, $S_3$ and $S_2$. The circuit through $S_2$ energizes $R_7$ and thus opens the circuit to $STR_2$ through $R_7(A)$ to stop the elevator in place. As the elevator arrives at its uppermost position, the photo beam is obstructed by the pan straps on the lower elevator shelf. This condition effects opening of the circuit to $R_4$ so that the contacts $R_4(ABC)$ move to normal position. Circuit to $STR_3$ through $S_4(A)$ and $R_4(C)$ is completed, thus allowing the live rolls 140 to discharge pans onto conveyor 23. As the pan straps clear the elevator, the photo beam becomes unobstructed. Thus $R_4$ is energized to effect opening of the circuit to $STR_3$ through $R_4(C)$ and stopping of the live rolls. In addition, $R_4(A)$ completes the circuit to the top pusher ram clutch solenoid $SOL_1$, and this causes the upper set of pan straps to be pushed from the bread rack 35 onto the elevator. The operating cycle then progresses as outlined before.

Should the elevator reach its uppermost position before a loaded rack is properly positioned, the elevator closes limit switches $S_3$, $S_2$ and $S_4(A)$, completing the circuit to $R_5$ and $S_1(A)$. Both $R_5(A)$ and $S_4$ open the circuit to $STR_2$, causing the elevator to stop. The circuit to $STR_3$ is closed through $S_4(A)$ and $R_4(C)$ when the photo beam is obstructed by pans on the elevator, and causes actuation of the live rolls 140 and transfer of the pan straps from the elevator onto conveyor. When the pans have been discharged from the support of the elevator and the photo beam becomes unobstructed, $R_4$ is energized to break the circuit to $STR_3$ through $R_4(C)$ and consequently the live rolls 140 are stopped. When this part of the cycle has been completed and a rack has not yet entered the unloader, the entire control system remains inactive, awaiting the arrival of a loaded rack.

It has been stated that the present invention also includes a rack loading apparatus 33 for placing pan straps 25 on the racks 35 prior to their movement along the monorail 55 into the proof box 39. The rack loading apparatus 33 is similar to the rack unloading apparatus 40 in that it includes the same main elements, that is, an elevator and a pusher mechanism. However, these elements are arranged in a different order with respect to the rack to be operated upon. In the rack loading apparatus 33, the elevator 200 (Fig. 10) is located between the rack 35 to be loaded and the pusher mechanism 201, whereas in the rack unloader 40 the rack to be unloaded is disposed between the pusher mechanism 60 and the elevator means 61.

The rack loading apparatus includes a framework 205 which supports the elevator 200 and the pusher mechanism 201. The monorail 55 extends through the framework 205 so that the racks 35 can be moved into the rack loading apparatus. The elevator 200 of the rack loader 33 is merely an open box-like frame having horizontal rests or shelves 206, 207, 208, 209, 210 and 211. The elevator 200 is supported by and adapted to move vertically along guide bars 212 carried by the framework 205. As in the rack unloader 40, the elevator 200 of the rack loader 33 is adapted to be alternately raised and lowered by means of a reversible electric motor (not shown). The shelves 207 to 211 of the elevator 200 are adapted to support pan straps 25 and are equal in number to one-half the number of shelves 48 to 57 of the rack to be loaded. The elevator 200 is adapted to be moved with an intermittent motion so as to successively align its shelves with the conveyor 30, previously mentioned as leading from the panner 28 where the pans 26 of the straps 25 are loaded with dough, the movement of the elevator being controlled by a system such as that shown in Fig. 9 and previously described in connection with the rack unloader 40. By this means, the individual shelves of the elevator are filled with pan straps delivered thereto by the conveyor 30 and as each shelf is loaded and this condition is detected by a photo-electric detector, such as that designated $R_3$ in Fig. 9, the elevator motor $M_3$ is energized to index the elevator through a distance equal to the vertical spacing between the elevator shelves.

Following the loading of all the shelves 207 to 211 of the elevator 200 with pan straps 25, the pan straps are transferred simultaneously from all the elevator shelves onto those of the rack 35 by the pusher mechanism 201.

The pusher mechanism comprises an upper pusher ram 220 and a lower pusher ram 221, these parts corresponding to the pusher rams 75 and 76 of the rack unloader 40. The pusher rams 220 and 221 are adapted to be alternately moved in horizontal paths toward and away from the rack 35 by a driving means of the type disclosed in Figs. 6, 7 and 8 which is actuated in response to the control means shown in Fig. 9. The pusher rams 220 and 221 have pusher bars 222 which are adapted to engage the pan straps 35 on the shelves of the elevator to transfer the straps from the elevator onto either the upper or lower group of the shelves of the rack 35, depending upon the position of the elevator 200. Preferably, the rate of loading of the straps onto the rack 35 is proportional to the rate of delivery of the loaded pan straps 25 from the panner. As will be apparent, it is important that the elevator be maintained in each of its indexed positions until it receives the number of pan straps required to fill each shelf aligned with the conveyor 30 and this may be accomplished by means of a photoelectric control device 225 which counts the straps delivered and functions to complete the circuit to the elevator motor after the required number of straps have been placed on each elevator shelf. The device 225, or an additional similar means, may control the output of the panner 28 so as to prevent overfeeding of the straps, which would result in jamming of the conveyors 29 and 30.

Figure 10:
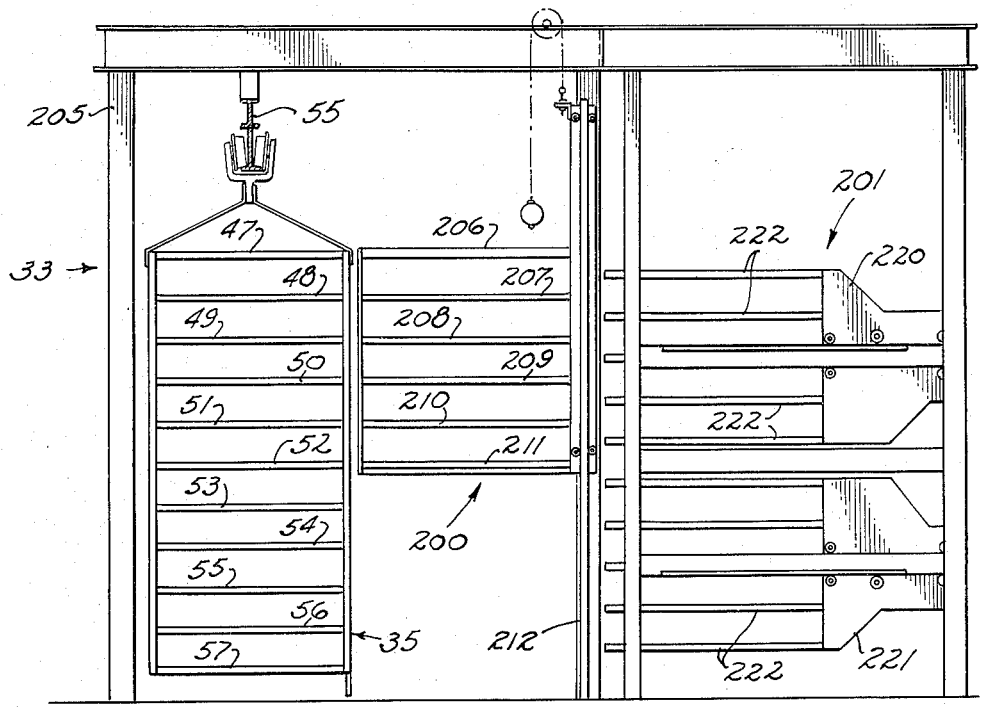
Fig. 10 is an end elevational view of the rack loading apparatus, as observed in the direction of the arrow 10 in Fig. 1.

The operation of the rack loading apparatus 33 is briefly explained as follows: Assuming that a rack 35 is in place within the apparatus and that the elevator 200 is in its uppermost position as illustrated in Fig. 10, the lowermost shelf 211 of the elevator is aligned with the end of the conveyor 30 to adapt it to receive loaded pan straps 25 thereon. The loaded straps are fed onto the shelf 211 until the shelf is completely loaded and at this time the photo-electric control means 225 acts to check further feeding of the straps and at the same time closes the circuit to the elevator motor. The elevator motor then functions to lower the elevator through a distance sufficient to align the next shelf 210 of the elevator with the conveyor 30, after which the motor stops, due to the action of a limit switch, such as described hereinbefore. The device 225 then allows the conveyor 30 to feed loaded pan straps 25 onto the shelf 210 until this shelf is loaded, at which time the feeding of the straps is stopped and the elevator again lowered to align the next shelf 209 with the conveyor 30. This intermittent downward movement of the elevator 200 continues until all the shelves 207 to 211 have been completely loaded with the filled pan straps 25. At this time, the elevator 200 is in lowermost position and its shelves 207 to 211 are in alignment respectively with the shelves 53 to 57 of the rack 35, and with the several pusher bars 222 of the lower pusher ram 221. The operation of the elevator motor is at this time stopped and its polarity is reversed by the means previously described in connection with the rack unloader. The lower pusher ram 221 is next operated so that its pusher bars 222 move in between the shelves 207 to 211 and push the pan straps therefrom and onto the shelves 53 to 57 of the rack, the ram 221 then returning to the position shown in Fig. 10.

The operation of the elevator 200 is then reversed so that it is moved intermittently in an upward direction, loaded pan straps 25 being deposited on the appropriate shelf following each upward indexing thereof. Eventually, the elevator 200 arrives at the position shown in Fig. 10, at which time the motion of the elevator is stopped and the upper pusher ram 220 is actuated to push the pan straps from the elevator shelves onto the upper shelves 48 to 52 of the rack 35. With the rack 35 thus completely loaded, the monorail motor is energized to cause it to propel the loaded rack from the loader 33 and into the proof box 39, and to bring an empty rack into the apparatus for receiving loaded pan straps, and the rack loader is again operated in the manner as outlined above. It is thus seen that the entire system shown in Fig. 1 is automatic and continuous so that a steady flow of loaded pan straps to the oven 21 is assured.

I claim as my invention:

1. In a bakery system having an oven, feeding means for feeding straps of pans of dough to the oven and a rack having vertically spaced shelves for supporting the straps of pans, the combination of: conveyor means for conveying a rack to a position adjacent the feeding means; and transferring means operative to transfer the straps of pans from each of said shelves to the feeding means, said transferring means including pusher means for pushing the straps of pans from said shelves, and elevator means adapted to receive said straps, conveying means on said elevator means operative to convey said straps to the feeding means, and control means for the conveying means on said elevator means, said control means being actuated by the straps of pans transferred from said shelves to the conveying means on said elevator means.

2. In a bakery system having an oven, feeding means for feeding straps of pans of dough to the oven and a rack having vertically spaced shelves for supporting the straps of pans, the combination of: conveyor means for conveying a rack to a position adjacent the feeding means; and transferring means operative to transfer the straps of pans from each of said shelves to the feeding means, said transferring means including pusher means for simultaneously pushing the straps of pans from a plurality of the shelves, and a vertically movable elevator means having vertically spaced supports for receiving the straps, means for moving said elevator means vertically to align each of said supports with the feeding means, conveying means on said elevator means for conveying the straps of pans from each support so aligned onto said feeding means and control means for the conveying means on said elevator means, said control means being actuated by the straps of pans transferred from said shelves to the conveying means on said elevator means.

3. In a bakery system having an oven, feeding means for feeding straps of pans of dough to the oven and a rack having vertically spaced shelves for supporting the straps of pans, the combination of: conveyor means for conveying a rack to a position adjacent the feeding means; and transferring means operative to transfer the straps of pans from each of said shelves to the feeding means, said transferring means including pusher means for simultaneously pushing the straps of pans from a plurality of the shelves, and a vertically movable elevator means having vertically spaced supports for receiving the straps, means for intermittently moving said elevator means vertically to align successively each of said supports with the feeding means, conveying means on said elevator means for conveying the straps of pans from each support so aligned onto said feeding means and control means for the conveying means on said elevator means, said control means being actuated by the straps of pans transferred from said shelves to the conveying means on said elevator means.

4. The combination defined in claim 3 in which said pusher means is movable horizontally, and including power means for moving said pusher means, said control means being responsive to the absence of straps of pans on said elevator means for energizing said power means.

5. The combination defined in claim 3 in which said means for moving said elevator means includes electric power means, said control means being adapted to detect the presence of straps on each of said supports of said elevator means successively aligned with said feeding means and operative, following conveying of the straps from each support so aligned, to energize said power means.

6. The combination defined in claim 3 in which said conveying means comprises a plurality of vertically spaced sets of transverse rollers rotatable on said elevator means and providing said supports thereof, an endless driving member operatively connected to each roller of each set of rollers for rotating the same, a rotatable driving element connected to and adapted to rotate each of said driving members, and a single operating means adapted to rotate each of said driving elements successively presented thereto during raising and lowering of said elevator means.

7. A conveyor system for use in a bakery having an oven with means for feeding straps of pans of dough thereto and a rack having vertically spaced shelves for supporting the straps of pans, said conveyor system including means operative to transfer the straps of pans from each of said shelves to the feeding means, said transferring means including pusher means having a plurality of horizontally movable pusher bars for simultaneously pushing the straps of pans from a like number of the rack shelves, vertically movable elevator means having supports equal in number to said pusher bars for receiving the straps of pans pushed from the rack, said pusher means including an upper carriage and a lower carriage, said carriages being movable horizontally toward and away from the rack, each carriage having pusher bars equal in number to one-half the number of shelves of the rack, and including operating means for alternately operating each carriage to cause the pusher bars thereof to push the straps of pans alternately from the upper and lower shelves of the rack, the supports of said elevator means being equal in number to one-half the number of shelves of the rack, said elevator means being alternately raised and lowered to align all of its supports alternately with all of the pusher bars of each of said pusher carriages, said elevator means being intermittently raised and lowered in increments equal to the spacing of its supports so as to successively align said supports with the feeding means.

8. The combination defined in claim 7 in which said elevator supports constitute conveying means, operating means for intermittently moving said elevator means vertically to align each of said conveying support means with the feed means and control means responsive to the conveying of the last straps of pans from said elevator means for alternately energizing said carriage operating means.

9. A conveyor system according to claim 7 wherein said supports of said elevator are conveyors and includes selective actuating means engageable with said conveyors of said elevator for driving that one of said conveyors of said elevator which is in registry with said feeding means.

10. In a bakery system having an oven, feeding means for feeding straps of pans of dough to the oven, and a rack having vertically spaced shelves for supporting the straps of pans, the combination of a transfer means for transferring the straps of pans from the shelves of said rack to the feeding means including a pusher means and an elevator means, said elevator means being disposed in spaced parallel and aligned relationship with said pusher means, conveyor means for conveying said rack to a position intermediate said pusher means and elevator means for actuating said pusher means, said pusher means engaging the pans on said rack for transferring said pans to said elevator means, conveying means on said elevator means operative to convey said straps of pans to said feeding means, actuating means associated with said elevator means for controlling the movement of said elevator and the conveying means on said elevator, said actuating means being controlled by the movement of said pans by said pusher means.

11. In a conveyor system, the combination of first and second conveying means arranged to move in relatively parallel paths, said second conveying means having a second path of movement between predetermined limits transverse to its first mentioned path of movement, transferring means movable relative to said first and second conveying means, actuating means operatively connected to said transferring means for moving said transferring means to transfer articles from said first conveying means to said second conveying means when said second conveying means is at the limit of its movement in one of its paths of movement, and control means responsive to the presence or absence of articles on said second conveying means and operatively connected to said actuating means for energizing said actuating means in the absence of any articles on said second conveying means.

12. A conveyor system for use in a bakery having an oven, means for feeding straps of pans of dough thereto, a movable rack having vertically spaced shelves for supporting the straps of pans, elevator means provided with vertically spaced generally horizontal supports, said rack having one shelf less than twice the number of supports of said elevator with the shelves of said rack comprising an upper group and a lower group and the lower group having one less shelf than the upper group, said elevator means being movable vertically relative to said rack from one loading position to a second loading position with the uppermost support of said elevator being aligned with the uppermost shelf of said rack when said elevator means is in the first loading position and with the lowermost support of said elevator means being in alignment with the lowermost shelf of said rack when said elevator is in the second loading position, transfer means to transfer the straps of pans from each of said shelves to the supports of said elevator means comprising pusher means having an upper carriage and a lower carriage, the upper carriage of said pusher means having pusher bars for pushing the straps of pans simultaneously from all the shelves of the upper group onto the supports of said elevator means when the elevator means is in the first loading position, said lower carriage having pusher bars for pushing the straps of pans simultaneously from all the shelves of the lower group onto the supports of said elevator means when said elevator means is in the second loading position, the lower carriage of said pusher means having one less pusher bar than said upper carriage, said elevator means being intermittently raised and lowered between said loading positions to successively align the supports of said elevator means with the feeding means for unloading each support successively of said elevator means that is to be loaded in the second loading position.

13. A conveyor system according to claim 12 wherein said supports of said elevator are conveyors and includes selective actuating means engageable with said conveyors of said elevator for driving that one of said conveyors of said elevator which is in registry with said feeding means.

14. A conveyor system for use in a bakery having an oven, means for feeding straps of pans of dough thereto, a movable rack having vertically spaced shelves for supporting the straps of pans, elevator means provided with vertically spaced generally horizontal supports, said rack having one shelf less than twice the number of supports of said elevator with the shelves of said rack comprising an upper group and a lower group and the lower group having one less shelf than the upper group, said elevator means being movable vertically relative to said rack from one unloading position to a second unloading position with the uppermost support of said elevator being aligned with the uppermost shelf of said rack when said elevator means is in the first unloading position and with the lowermost support of said elevator means being in alignment with the lowermost shelf of said rack when said elevator is in the second unloading position, transfer means to transfer the straps of pans from each of said supports of said elevator means to said shelf comprising pusher means having an upper carriage and a lower carriage, the upper carriage of said pusher means having pusher bars for pushing the straps of pans simultaneously from the supports of said elevator means onto all the shelves of the upper group when the elevator means is in the first unloading position, said lower carriage having pusher bars for pushing the straps of pans simultaneously from the supports of said elevator means onto all the shelves of the lower group when said elevator means is in the second unloading position, the lower carriage of said pusher means having one less pusher bar than said upper carriage, said elevator means being intermittently raised and lowered between said unloading positions to successively align the supports of said elevator means with the feeding means for loading each support successively of said elevator means that is to be unloaded in the second unloading position.

15. A conveyor system for use in a bakery having an oven with means for feeding straps of pans of dough thereto and a rack having vertically spaced shelves for supporting the straps of pans, said conveyor system comprising means operative to transfer the straps of pans from each of said shelves to the feeding means, said transferring means including pusher means for pushing the straps of pans from said shelves, elevator means having vertically spaced conveyors for receiving said straps, said conveyors being operative to convey said straps to the feeding means, means for moving said elevator means vertically to successively align each of said conveyors with the feeding means, control means responsive to presence of straps of pans on a conveyor so aligned with said feeding means to stop said elevator in such aligned position, actuating means for said conveyors, and means responsive to alignment of a conveyor with said feeding means for operatively connecting said actuating means with the conveyor so aligned.

References Cited in the file of this patent

UNITED STATES PATENTS

| | | |
|---|---|---|
| 1,165,035 | Streit | Dec. 21, 1915 |
| 1,454,675 | Gantvoort | May 8, 1923 |
| 1,606,477 | McClelland | Nov. 9, 1926 |
| 1,763,812 | Olson | June 17, 1930 |
| 1,779,210 | Davis | Oct. 21, 1930 |
| 1,879,713 | Scott | Sept. 27, 1932 |
| 1,938,104 | Jennings | Dec. 5, 1933 |
| 1,955,959 | Harnischfeger et al. | Apr. 24, 1934 |
| 2,304,447 | Feusier | Dec. 8, 1942 |
| 2,457,135 | Deiters | Dec. 28, 1948 |
| 2,536,756 | Lopez | Jan. 2, 1951 |
| 2,599,693 | Chapman | June 10, 1952 |
| 2,605,004 | Grueneberg | July 29, 1952 |
| 2,605,912 | Small et al. | Aug. 5, 1952 |
| 2,617,546 | Rosener | Nov. 11, 1952 |

FOREIGN PATENTS

| | | |
|---|---|---|
| 152,437 | Switzerland | Apr. 16, 1932 |
| 420,394 | Great Britain | Nov. 30, 1934 |
| 433,778 | Great Britain | Aug. 15, 1935 |
| 54,805 | Norway | Jan. 14, 1935 |